(12) United States Patent
Jarvis et al.

(10) Patent No.: US 11,463,434 B2
(45) Date of Patent: Oct. 4, 2022

(54) COMPUTER-BASED SYSTEMS INVOLVING ENHANCED ONE-TIME PASSCODE (OTP) MESSAGING AND METHODS OF USE THEREOF

(71) Applicant: Capital One Services, LLC, McLean, VA (US)

(72) Inventors: Daniel Alan Jarvis, Vienna, VA (US); Jon Whitmore, Washington, DC (US); Patrick Zearfoss, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 8 days.

(21) Appl. No.: 17/141,966

(22) Filed: Jan. 5, 2021

(65) Prior Publication Data

US 2022/0217135 A1 Jul. 7, 2022

(51) Int. Cl.
*H04L 9/40* (2022.01)
*G06F 21/62* (2013.01)
*G06F 9/451* (2018.01)
*G06F 21/00* (2013.01)

(52) U.S. Cl.
CPC .......... *H04L 63/0838* (2013.01); *G06F 9/451* (2018.02); *G06F 21/629* (2013.01); *H04L 63/0853* (2013.01)

(58) Field of Classification Search
CPC ............. H04L 63/0838; H04L 63/0853; G06F 21/629; G06F 21/30; G06F 21/31; G06F 21/34; G06F 21/42; G06F 21/45; G06F 9/451
See application file for complete search history.

(56) References Cited

U.S. PATENT DOCUMENTS

| | | | |
|---|---|---|---|
| 8,572,684 B1 * | 10/2013 | Sama | H04L 63/0838 726/4 |
| 9,251,252 B2 | 2/2016 | Naaman et al. | |
| 9,591,086 B2 | 3/2017 | Brezina et al. | |
| 2002/0073011 A1 | 6/2002 | Brattain et al. | |
| 2002/0107991 A1 | 8/2002 | Maguire et al. | |
| 2012/0192255 A1 * | 7/2012 | Ganesan | H04L 63/0838 726/6 |
| 2016/0197914 A1 * | 7/2016 | Oberheide | H04L 63/0853 713/183 |
| 2017/0293937 A1 | 10/2017 | Gilliam | |

* cited by examiner

*Primary Examiner* — Edward Zee
(74) *Attorney, Agent, or Firm* — Greenberg Traurig, LLP

(57) ABSTRACT

Systems and methods for enhanced OTP messaging, comprising: receiving a request from an application executing on a computing device of a user; generating the supplemental information based on the request; segmenting the supplemental information into a first part of the supplemental information and a second part of the supplemental information; transmitting the first part of the supplemental information to the computing device of the user via a first communication channel to another app executing on the computing device of the user; instructing the another app to allow the user to utilize one or more graphical user interface (GUI) elements of a GUI of the another app to transfer the first part of the supplemental information to the app; and transmitting the second part of the supplemental information to the computing device of the user via a second communication channel so as to provide the supplemental information to the app.

18 Claims, 11 Drawing Sheets

COMPUTER-BASED SYSTEMS INVOLVING ENHANCED ONE-TIME PASSCODE (OTP) MESSAGING AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved messaging, improved challenge based authentications, improved computer-based platforms or systems, improved computing components and devices and/or improved computing methods configured for one or more novel technological applications involving enhanced one-time passcode (OTP) messages.

BACKGROUND OF TECHNOLOGY

A computer network platform/system may include a group of computers (e.g., clients, servers, computing clusters, cloud resources, etc.) and other computing hardware devices that are linked and communicate via software architecture, communication applications, and/or software applications associated with electronic transactions, data processing, and/or account management.

SUMMARY OF DESCRIBED SUBJECT MATTER

In some embodiments, the present disclosure provides various exemplary technically improved method for enhancing OTP based authentication, comprising operations such as:
  receiving, by a processor, a request from an application (app) executing on a computing device of a user, the request being transmitted in response to the user operating the app to a stage where supplemental information is required to further operate one or more functionalities of the app;
  generating, by the processor, the supplemental information based on the request;
  segmenting, by the processor, the supplemental information into a first part of the supplemental information and a second part of the supplemental information;
  transmitting, by the processor, the first part of the supplemental information to the computing device of the user via a first communication channel to another app executing on the computing device of the user;
  instructing, by the processor, the another app to allow the user to utilize one or more graphical user interface (GUI) elements of a GUI of the another app to transfer the first part of the supplemental information to the app;
  receiving, by the processor, an indication of the transferring; and
  transmitting, by the processor based on the indication of the transferring, the second part of the supplemental information to the computing device of the user via a second communication channel so as to provide the supplemental information to the app.

In some embodiments, the present disclosure provides various exemplary technically improved method for enhancing OTP based authentication, comprising operations such as:
  receiving, by a server, a request from an application (app) executing on a computing device of a user to a server, the request being transmitted in response to the user operating the app to a stage where supplemental information is required to further operate one or more functionalities of the app;
  determining, by the server, the supplemental information based on the request;
  anonymizing, by the server, a portion of the supplemental information into unreadable format;
  transmitting, by the server, the unreadable portion of the supplemental information in a message to a messaging app executing on the computing device;
  detecting, by the server, that the user uses one or more graphical user interface (GUI) elements of a GUI of the messaging app to transfer the unreadable portion of the supplemental information to the app; and
  causing, by the server, in response to the detecting, to provide a remaining part of the supplemental information to the app.

In some embodiments, the present disclosure also provides exemplary technically improved computer-based systems, computer-implemented methods, and computer-readable media, including media implemented with and/or involving one or more software applications, whether resident on computer devices or platforms, provided for download via a server and/or executed in connection with at least one network such as via a web browser application, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
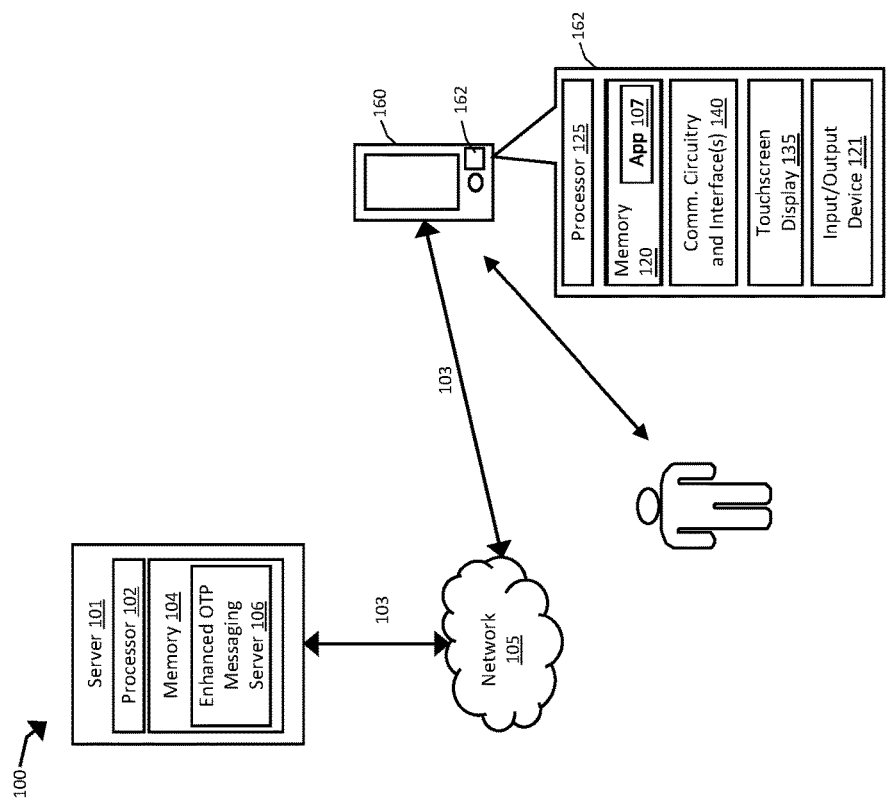
FIG. 1 is a block diagram of an exemplary system and/or platform involving features of challenge based authentications via enhanced one-time passcode (OTP) messaging, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As explained in more detail, below, enhanced messages, systems, and methods for providing challenge based authentications involving enhanced OTP messaging are disclosed. According to some aspects, with exemplary enhanced OTP messaging, OTP information (e.g., supplemental information) may comprise at least a first part and a second part, the first part and the second part being transmitted via distinct messaging apps or messaging channels to a computing device of a user awaiting the OTP information to complete an authentication process with an app, a web browser page, etc. (collectively, an app) executing on the computing device. Further, the second part may only be transmitted to the computing device upon the first part having been received at the computing device and transferred to the app. According to some other aspects, exemplary enhanced OTP messaging may have at least part of the OTP information anonymized into an unreadable format for transmission to the computing device of the user. This way, the OTP information, when received and displayed in a message at a messaging app executing on the computing device of the user, may not be readable, visually accessible, audibly accessible, or otherwise comprehensible to the user. In this embodiment, the transfer of the OTP information to the app is restricted to operations provided at the messaging app (or system level setting) such that, for example, the conventional way of the user reading out or writing down the OTP displayed in the messaging app for manual keying into the app is not supported. One exemplary way to restrictively transfer the OTP information to the app may be configured such that the messaging app, upon detecting the unreadable format of the OTP information and the message being transmitted from an OTP server, displays an operable GUI element on the messaging app to allow the OTP information to be transferred to the app upon the user's selection of the GUI element.

Further according to some other aspects, exemplary enhanced OTP messaging may configure part of the OTP message with a security token (e.g., secret knowledge shared between the user and the app server/OTP server) such that the OTP messages may be deemed as being transmitted from authorized app server or OTP server only when the security token is present in or displayed along with the OTP message. Augmented with the security token, the disclosed technology provides further enhanced security measures to safeguard against frauds involved with communicating sensitive information such as OTP.

Still further according to some other aspects, exemplary enhanced OTP messaging may customize the content and/or the format of OTP messages using the knowledge about the user's computing device and messaging app, as well as using a machine learning model trained with demographic data and behavioral data associated with an individual user or a group of user. Empowered with the insight and intelligence about the user, the user's contexts, similar users, user's computing device's capabilities and functionalities, the format, and content of the message may be customized to better appeal to the user, thereby contributing to a higher completion rate with regard to challenge based authentication involving the supplemental information.

While challenge based authentications and OTP information are used herein connection to illustrate various aspects of the disclosure, it should be understood that the disclosed technology pertains to any relevant application or process with which any type of information supplemental to their operations is required in a more secure and less fraud susceptible manner. By way of non-limiting examples, given the improvement that supplemental information is obfuscated into an unreadable format (or not displayed at all), the real content of the supplemental information is no longer subject to phishing activities (voice phishing, etc.) as the information can only be transferred in an automated cross-app fashion that is triggered by the user.

Various embodiments disclosed herein may be implemented in connection with one or more entities that provide, maintain, manage, or otherwise offer any services via enhanced messaging. In some embodiments, exemplary entity may be a financial service entity that provides, maintains, manages, or otherwise offers financial services. Such financial service entity may be a bank, credit card issuer, or any other type of financial service entity that generates, provides, manages, and/or maintains financial service accounts that entail providing one or more apps to service one or more customers with authentication features enabling security measures such as challenge based authentication, multi-factor authentication, and the like. Financial service accounts may include, for example, credit card accounts, bank accounts such as checking and/or savings accounts, reward or loyalty program accounts, debit account, and/or any other type of financial service account known to those skilled in the art.

FIG. 1 depicts an exemplary system 100 for improved challenge based authentications involving enhanced OTP messaging, in accordance with one or more embodiments of the present disclosure. System 100 may include a server 101 and a mobile device 160, which may communicate 103 over a communication network 105. As illustrated herein, the mobile device 160 may include any computing device or similar device through which a user of the mobile device 160 can access, via an app 107 executing on the mobile device 160, the services and/or data provided at the server 101. As used herein, such an app 107 may include a web browser or other type of app that permits a user to perform various actions with regard to the services provided at the server 101.

In some embodiments, the business or merchant associated with the app 107, typically a financial institution such as a credit card company that has issued a debit card or a credit card to the user, may wish to allow the user accesses to the services provided via the app 107 upon authentications triggered by a variety of conditions. For example, such authentication may be required after the user entering the correct credentials (e.g., a pair of user name and password) configured in association with the app upon the user logging in the app, or after the user logs into the app and during the course of the user attempting to perform certain activities (e.g., updating the profile settings of password, phone number, email address, etc., conducting various transactions, such as purchasing transactions, account withdrawal transactions, fund transfer transactions, of an amount exceeding a threshold) via the app 107. In various embodiments, the authentication process may cause the server 101 to transmit the OTP information via enhanced OTP messaging to the mobile device 160 for secure display and transferal to the app 107. In some embodiments, the OTP may be segmented by the server 101 into multiple parts for transmission to the mobile device 160 via distinct respective messaging channels (e.g., SMS, MMS, email, chat app). In some embodiments, the OTP may be anonymized the server 101 into an unreadable format such that when received and displayed at the mobile device 160, the user cannot comprehend the real content of the OTP (e.g., a random N-digit code, a random sequence of N images or symbols or animations, a random N number of alphanumeric characters, or a combination thereof). In some embodiments, as the user cannot read out or write down the real content of the OTP, the only way to transfer the real content of the OTP from the receiving messaging app to the app 107 is via a restrictive transfer mechanism provided by the messaging app. Details of the enhanced OTP messaging and the restrictive transfer are described with connection to FIGS. 2, and 3A-3C.

Still referring to FIG. 1, server 101 may include at least one processor 102, and a memory 104, such as random-access memory (RAM). In some embodiments, server 101 may be operated by the entity issuing a credit card, a debit card, by the merchant, and/or by any transaction processing entity involved with authenticating users for access. In some embodiment, the memory 104 may be configured to store code, when executed by processor 102, may cause the processor 102 to implement one or more functionalities of the enhanced OTP messaging server 106, for communicating messages at various modalities with the mobile device 160. In some embodiments, the server 101 may be coupled with a third-party messaging server to communicate in the form of messages with the mobile device 160.

In various embodiment, the enhanced OTP messaging server 106 may implement one or more aspects of various enhanced OTP messaging schemes herein, including those involving: (1) generating an OTP in response to a request pertaining to an authentication requirement, (2) segmenting an OTP into at least a first part and the second part, (3) anonymizing at last part of the OTP into an unreadable format, (4) generating at least part of the OTP message to include a security token, (5) customizing the content and/or the format of the OTP messages, (6) transmitting the first part and the second part via distinct messaging app/messaging channels to the requesting device, (7) causing the OTP only transferrable to the authentication process via one or more graphical user interface (GUI) elements of a GUI of the messaging app, and/or (8) transmitting the second part to the requesting device upon receiving the indication that the first part has been received and transferred to the authentication process.

Mobile device 160, such as a smart phone or other portable or wireless or wearable electronic device, may include mobile device circuitry 162. Mobile device circuitry 162 may include a mobile device processor 125, memory 120 such as RAM, computer-readable media, communication circuitry and interface 140, and/or any input and/or output device 121, such as a touchscreen display 135. The memory may store code that, when executed by the processor, may cause the processor to implement one or more aspects of allowing a user to perform challenge based authentication utilizing the enhanced OTP messaging schemes herein, including those involving: (1) sending an OTP request in response to the user operates an app executing on the mobile device 160, (2) displaying the OTP message received at a messaging app, and/or (3) allowing the user to utilize one or more graphical user interface (GUI) elements of a GUI of the messaging app to transfer the OTP information to the app.

Mobile device may also display various graphical user interfaces that a user may utilize to perform challenge based authentications via enhanced OTP messaging features herein. Non-limiting examples are illustrated with connection to FIGS. 3A-3C, below. Further, in some embodiments, mobile device 160 may be configured to operate in conjunction with other computing devices (e.g., a desktop or a laptop), at which the app pending authentication is executing. In this example, the mobile device may be configured to operate to provide at least one messaging app/channel to implement the enhanced OTP messaging schemes herein.

Various embodiments associated with FIG. 1 and related disclosure herein solve a technical problem of providing challenge based authentications with enhanced security against frauds like voice phishing. Various embodiments are implemented based on features and functionality including enhancing OTP embedding messages as well as the transmission and transfer thereof such that the OTP information received and displayed at the mobile device 160 no longer is subject to frauds or accidents leading to the cases where an illegitimate user obtains the OTP and authenticates as a legitimate user to access the services/data associated with the legitimate user.

Various embodiments of the disclosure herein further solve another technical problem of providing challenge based authentication with enhanced security against counterfeit OTP messages transmitted from fraudulent parties. Various embodiments are implemented based on features and functionality including enhancing OTP messages with a security token indicative of the authorization identity associated with the OTP server. Such security token may be configured by the user in association with the app 107 and stored in a database accessible to the server 101. A security token may also be dynamically generated and transmitted to the user via different modalities for cross-verification in real time, alleviating the user from memorizing the pre-configured security token associated with the app 107.

Further, various embodiments of the disclosure herein also solve another technical problem of providing challenge based authentication with enhanced completion rate in terms of utilizing the OTP to complete the required authentication. Various embodiments are implemented based on features and functionality including enhancing OTP messages with customized content and format with which the user is more likely to interact therewith. The content and/or format of OTP message may be customized using various machine learning techniques such as an AI model established based on the user's historical and habitual data, and a group of users' historical and habitual data.

While only one server 101, network 105, mobile device 160, and app 107 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. For instance, the system may further include a computing device (not shown) which has the app 107 executing thereon, but not equipped with wireless communication capabilities to be able to receive SMS messages. In this scenario, the server 101 may be configured to dynamically detecting that the user operates the app 107 at a device without the SMS messaging capabilities, and thereby causing the enhanced OTP messaging to be performed with connection with messaging apps operative at modalities other than the SMS (e.g., email, chat channels). Nevertheless, the server 101 may also be configured to still perform the enhanced OTP messaging via the SMS app executing on the mobile device 160, at the same time enabling the SMS app to activate a cross-device restrictive transfer (e.g., air drop to specific app only) from the mobile device 160 to the app 107 running on the computing device, upon the user's operation of such transfer. The following illustrates embodiments of the disclosure using examples of a mobile device that may be configured to execute at least two messaging app to be able to at least receive messages at the two respective messaging modalities, as well as to execute the app 107.

Figure 2:
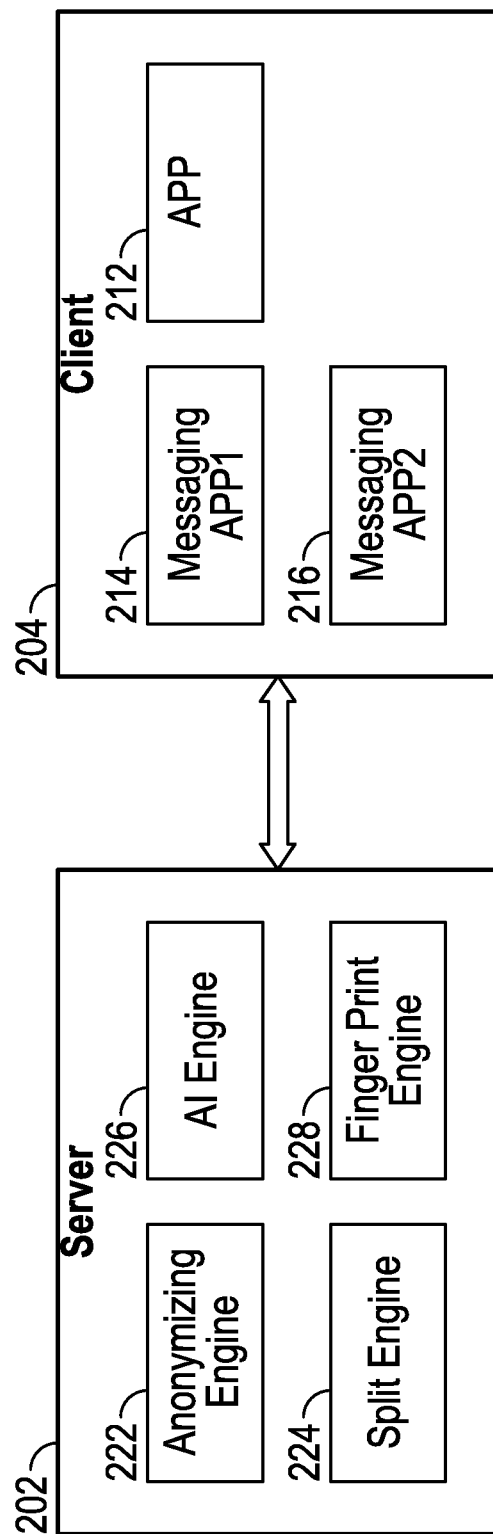
FIG. 2 is a block diagram of an exemplary challenge based authentication system via enhanced OTP messaging, consistent with exemplary aspects of certain embodiments of the present disclosure.

FIG. 2 shows a diagram of an exemplary challenge based authentication system involving enhanced OTP messaging, consistent with disclosed embodiments. In some embodiments, the challenge based authentication system may include a server system 202 and a client system 204. As shown in this example, the server system 202 may include an anonymizing engine 222, a split engine 224, an artificial intelligence (AI) engine 226, and a security token engine 228. The client system 204 may include an app 212, a first messaging app 214, and a second messaging app 216. According to various aspects of the disclosure, the app 212 may be a web browser or any type of app that requires authentication of a user interacting therewith. In some embodiments, the authentication is based on the user entering into the app 212 information that matches up with the supplemental information transmitted from the server system 202 to the client system 204. In various embodiments, such supplemental information may be communicated independently from the app 212 via channels such as messaging channels. In some embodiments, the supplemental information may comprise an authentication factor which can be utilized to authenticate the user. In one example, the authentication factor may include an OTP. In some embodiments, the app 212 may implement the app 107 of FIG. 1.

In various implementations, the first messaging app and the second messaging app may be configured to receive the supplemental information from the server system 202 at the client system 204 as distinct modalities. For example, the first messaging app may be an SMS app; while the second messaging app may be an email app, or a chat app. Various embodiments herein may be configured such that the first messaging app and the second messaging app are enabled with a restrictive transfer user interface (UI) element to allow the user to provide the OTP information to the app 212. The details of exemplary restrictive transfer UIs are illustrated with connection to FIGS. 3A-3C, below.

The server system 202 may generate the supplemental information responsive to receiving a request from the client system 204. In various embodiments, the request may be generated upon the user operates the app 212 to a stage when the above-described authentication requirement is invoked. The generated supplemental information may be further fortified based on the processing of at least one of the anonymizing engine 222, the split engine 224, the AI engine 226, and the security token engine 228. In some embodiments, the server system 202 may also be configured to generate the respective portions of the supplemental information, which are provided to at least one of the anonymizing engine 222, the split engine 224, the AI engine 226, and the security token engine 228 for fortification, in a piecemeal fashion. In some embodiments, the AI engine 226 and the security token engine 228 may be configured to specify features of the messages embedding the supplemental information for transmitting to the client system 204. For example, the AI engine 226 and/or the security token engine 228 may be configured to dynamically specify the content and/or the format of the messages with the supplemental information embedded therein.

In various embodiments, the split engine may be configured to segment input supplemental information into a plurality of parts. In some embodiments, the split engine may be configured to divide the supplemental information generated by the server system 202 into at least two parts: a first part and a second part, for transmission to the client system 204 separately via different messaging channels. In some embodiments, the first part of the supplemental information may be transmitted to the client system 204 in response to the request from the client system 204; while the second part of the supplemental information may be transmitted to the second messaging app 216 in response to the first part being received by the messaging app 214 and transferred into the app 212.

In various embodiments, the anonymizing engine 222 may be configured to transform input supplemental information into anonymized data. In some embodiments, the input information may include one or both of the first part of the supplemental information and the second part of the supplemental information. Any suitable techniques may be applied to render the input supplemental information into an unreadable format. Non-limiting examples of anonymized data may include: a string comprising one or more of randomized letters, numbers, and symbols; an image; an icon; an animation; and text including text in a language foreign to the user. In one example, the anonymized data may be entirely obfuscated such that the user is presented with a message informing of the use of a restrictive transfer GUI of the messaging apps to transfer the supplemental information (or portions thereof) into the app 212. In other words, the messaging apps may be configured not to display the supplemental information at all in the messages received, only allowing the transfer thereof to the app 212.

In various embodiments, the security token engine 228 may be configured to include a security token in the message of the supplemental information. According to various aspects of the disclosure, the security token may include one or more of: an image; a pass phrase; a tone; a displaying color; a displaying motif; and a displaying floating icon. In some embodiments, a security token may be pre-configured by the user for the account associated with the app 212, and stored in a dataset. In this case, a security token may be identified by the security token engine 228 based on the request from the client system 204. In some embodiments, the security token may be dynamically generated and transmitted to the user via another communication channel. If the user is able to match the security token included with the supplemental information with the security token sent in the other communication channel, then the messages comprising the supplemental information are deemed as being transmitted from an authentic server instead of a fraudulent party. In some embodiments, the security token included in the message is displayed to the user in association with the another app. In some embodiments, a security token is included in one or both of the message of the first part of the supplemental information, and the message of the second part of the supplemental information.

In various embodiments, the AI engine 226 may be configured to customize the content and/or the format of the messages including the supplemental information. The AI engine 226 may include one or more models established, trained, and retrained by any suitable machine learning algorithms, in conjunction with training datasets. In some embodiment, training datasets may include a number of training examples embodying a patterned occurrence in association with challenge based authentications. Each training example may include a number of (i.e., one or more) observed features (e.g., the content of the OTP messages, channels of the OTP messages) related to a known outcome (e.g., whether the user clicks through to complete the authentication). With the one or more models, the AI engine 226 may be configured to customize the content of the messages comprising the supplemental information based on one or more of: demographic data of the user; historical behavior data of the user; demographic data of a group of users; and historical behavior data of the group of users. In one example, the AI engine 226 may generate the OTP messages to include a favorite emoji of the user, cause the first part of the supplemental information to be transmitted to the mobile device of the user first, and the like.

In various embodiments, the AI engine 226 may be configured to further customize the format of the messages comprising the supplemental information. In some embodiments, the AI engine 226 may customize such as message for being displayed differently via one or more of: a preview badge of GUI of the another app, a push notification the GUI of the another app, a full-blown GUI of the another app, information of the mobile device, and information of an operating system of the mobile device. For example, upon detecting the operating system of the user's mobile device is an Android system, the AI engine 226 may generate the OTP messages such that when displayed in a preview badge on a user interface (UI) of the messaging app at the mobile device, the messaging app is enabled with an operable GUI element (e.g., a "copy code" button), without displaying the anonymized supplemental information at the UI. For another example, upon detecting the operating system of the user's mobile device is an iOS system, the AI engine 226 may generate the message such that, when displayed at the push notification on the GUI of the messaging app, the supplemental information is displayed in the unreadable format and as an operable GUI element to allow the user to select to transfer to the app 212, without displaying separately another GUI element such as a "copy code" button on the UI.

Further, it should be appreciated that one or more of the illustrative components/modules/engines in FIG. 2 may include other components, sub-components, modules, sub-modules, and device commonly found in a communication/computing system, which are not discussed above with reference to challenge based authentication system and not discussed herein for clarity of the description. Additionally, in some embodiments, one or more of the illustrative components/modules/engines can form a portion of another component/module/engine and/or one or more of the illustrative components/modules can be independent of one another.

Figure 3A:
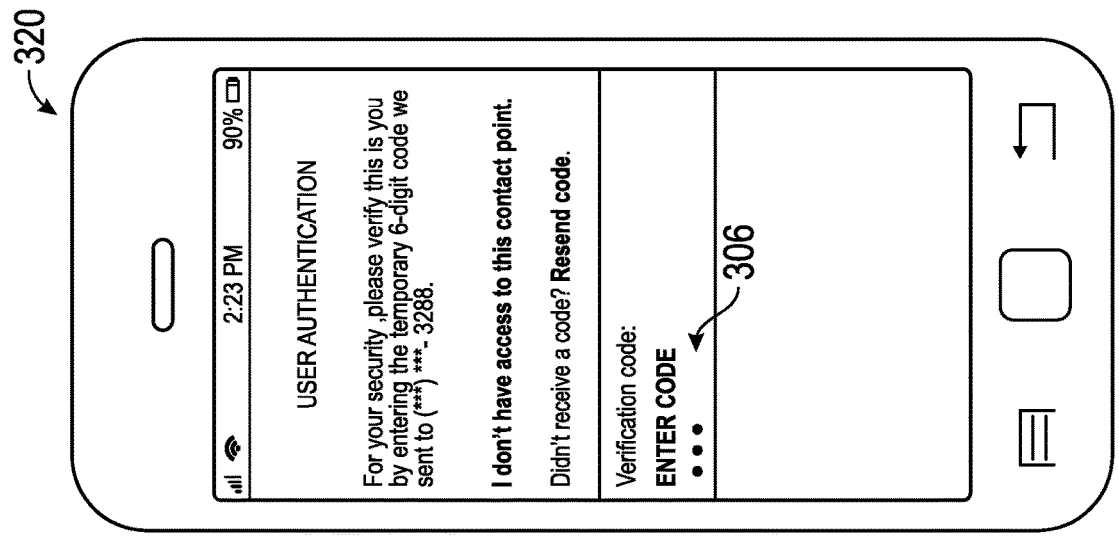
FIGS. 3A, 3B, and 3C are diagrams of certain illustrative aspects of exemplary graphical user interfaces (GUIs) enabling a user to perform challenge based authentication via enhanced OTP messaging, consistent with exemplary aspects of certain embodiments of the present disclosure.
Figure 3A:
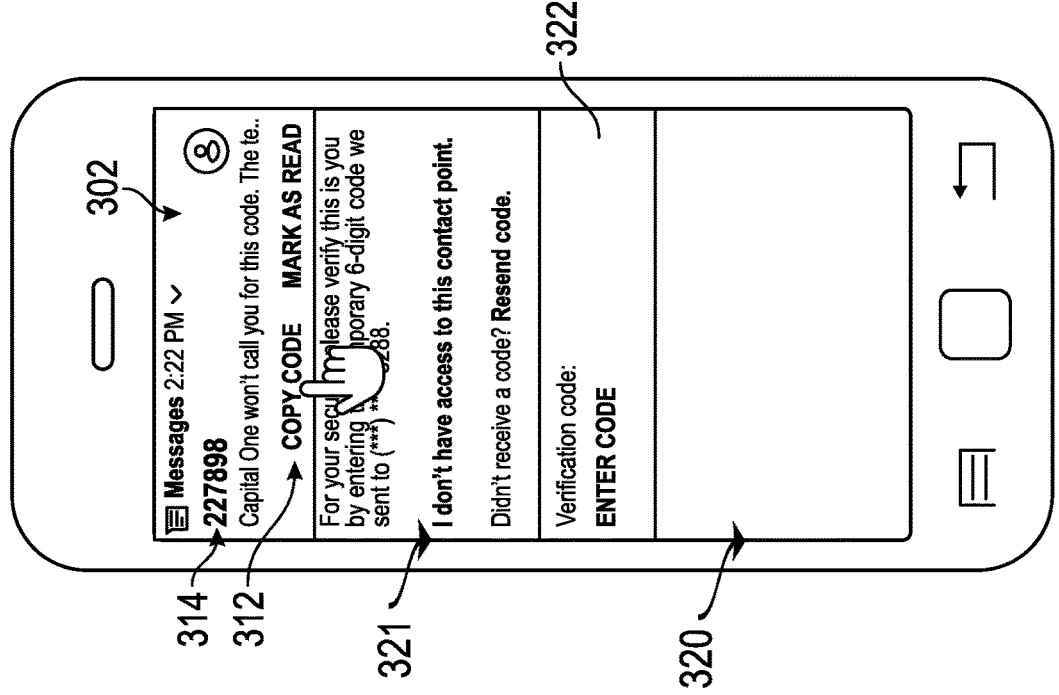
Figure 3B:
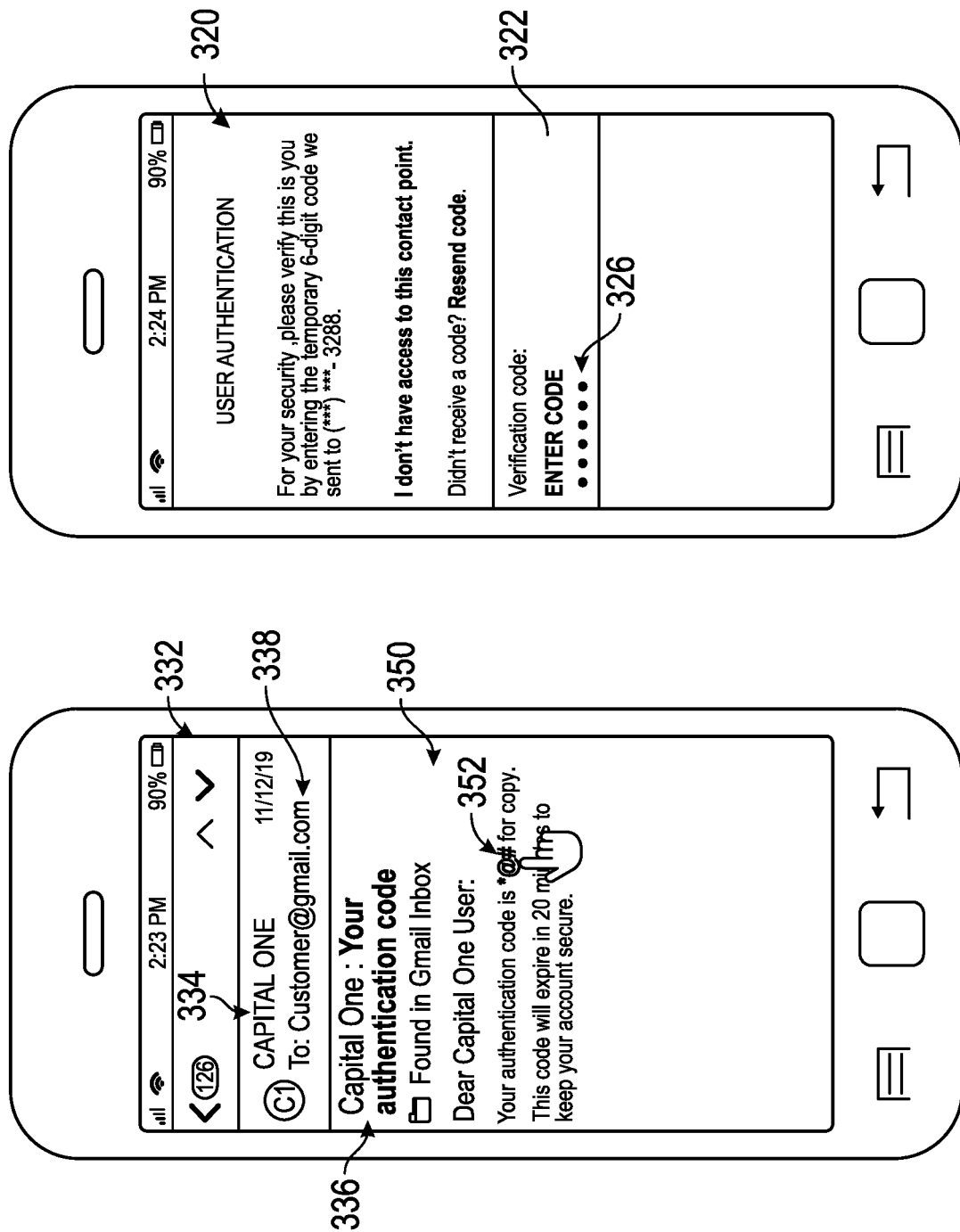
Figure 3C:
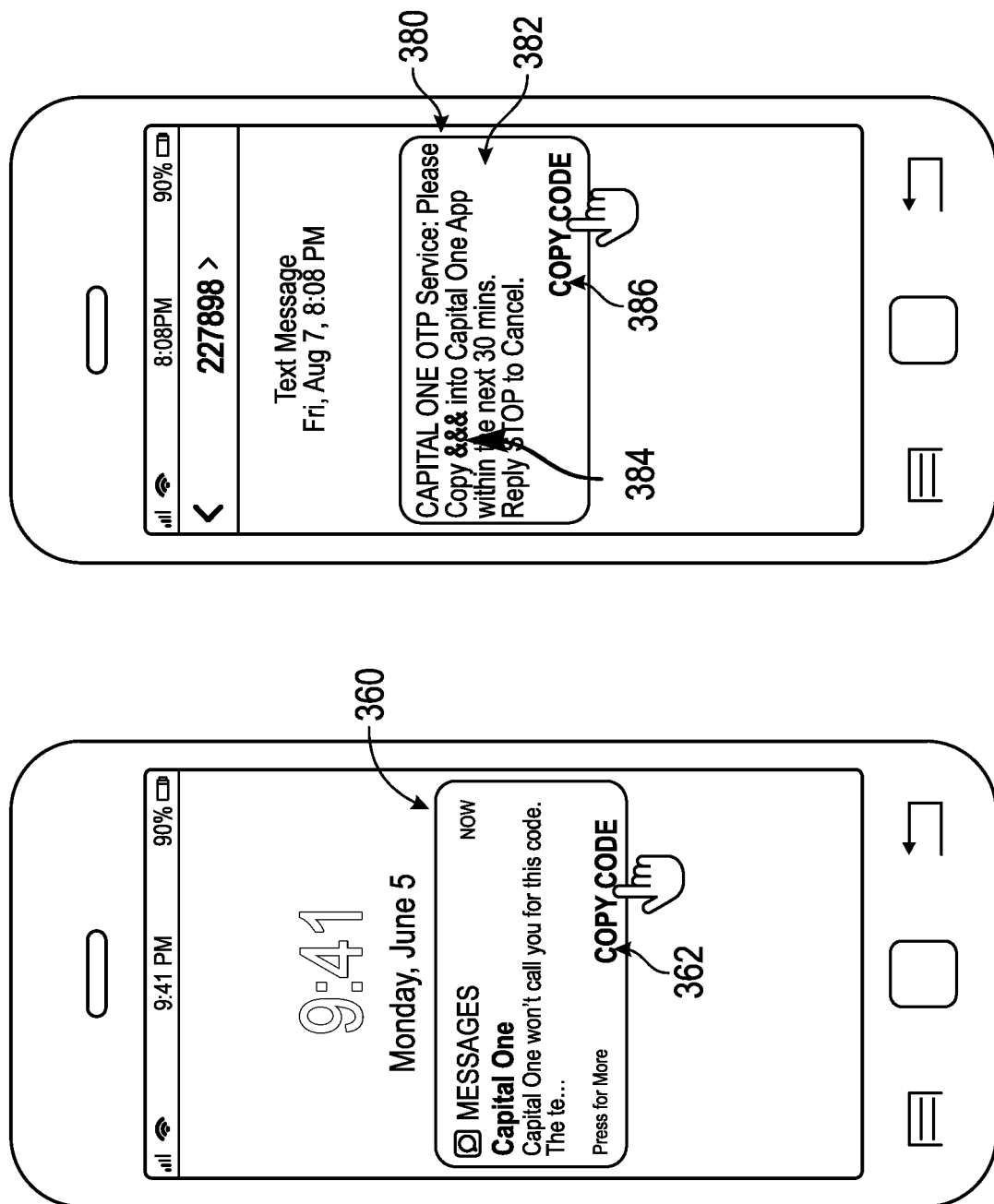

FIGS. 3A-3C are schematic diagrams of certain illustrative aspects of exemplary user interfaces for enabling a user to perform challenge based authentication via enhanced OTP messaging, consistent with exemplary aspects of certain embodiments of the present disclosure. Referring to FIG. 3A, a simplified schematic diagram showing an exemplary messaging app 302 displayed atop an app 320 is illustrated at the left hand side. Here, the app 320 has progressed to the stage where authentication is required before the user is able to further operate the app 320 to access its functionalities. As shown in this example, the app 320 displays a text message informing the user that "For your security, verify this is you by entering the temporary 6-digit code we sent to (*) *-3288" in a text panel 321. The app 320 further displays a text field 322 for the user to enter the verification code when it is received.

As illustrated herein FIG. 3A, at this point of time, the user has already received the first part of the supplemental information (e.g., OTP) at the first messaging app 302. In this example, the first messaging app is shown as an SMS app, which displays the received first part of the OTP in a banner display. As shown herein, the banner displays that the message is sent from an entity 314 associated with "227896" and only partial content of the OTP message is displayed. Detecting that the message contains OTP information, the first messaging app 302 is configured to present to the user a "COPY CODE" button 312. As such, the user does not need to expand on the GUI of the first messaging app 302 to access the first part of the OTP in order to copy the code into the app 320. Instead, the user can select the "COPY CODE" button 312, and subsequently pasts into the text field 322 of the app 320 shown on the right hand side. In this example, upon receiving the transferred first part of the OTP, the app 320 displays the content of the first part of the OTP as three dots 306 to safeguard the content.

Next, as illustrated on the left hand side of FIG. 3B, the user receives the second part of the OTP in the second messaging app. Here, the second messaging app is illustrated as an email app 332. As shown herein, the email app 332 displays in the "From" field 334 that the email message is sent from Capital One; in the "To" field 338 that the email message is directed to the user at the email address of customer@gamil.com, and in the subject field 336 that "Capital One: You authentication code." Further, the email app 332 further displays the anonymized second part 352 of the OTP as part of the content in body field 350. Similarly, the anonymized second part 352 of the OTP is rendered by the email app 332 as an operable link. Upon the user's selection of the displayed second part, and a subsequent operation to paste into the text field 322 of the app 320 shown at the right hand side of FIG. 3B, the real content of the second part of the OTP is transferred securely from the email app 332 to the app 320, without the user or other parties being able to comprehend the real content of the second part of the OTP. In some embodiment, in order to prevent the user from entering the second part (or the first part) of the OTP displayed in the unreadable format into the text field 322, the app 320 may be configured not accept the information keyed by the user into the text field 322. For example, when the user attempts to key the anonymized data "*@#" as the second part of the OTP into the app 320, the app 320 may be configured not to accept input from input devices such as a keyboard, soft keyboard, or voice input. Instead, although not shown here, the app 320 may be configured to display an alert window to notify the user that the OTP information can only be transferred thereinto via interacting with the operable information itself, and/or via the GUI element that enables the transfer. As shown herein at the right hand side of FIG. 3B, at this point of time the text field 322 is now populated with six dots 326, indicating that the app 320 has received the complete OTP and is ready to authenticate the user based on the received OTP.

FIG. 3C further illustrates two exemplary user interfaces of the messaging apps associated with the enhanced OTP messaging. As shown on the left hand side of FIG. 3C, upon receiving an OTP message, the messaging app displays the OTP message in a push notification window 360. Here, in this example, a "COPY CODE" button 362 is rendered and displayed at the push notification window 360, in which the entire content of the OTP message is not displayed. Also shown herein the right hand side of FIG. 3C, upon receiving an OTP message, the messaging app displays the OTP message in a full-blown window 380. Here, the OTP message 382 is displayed with a "COPY CODE" button 386 in the text conversation thread. Further, as the OTP message 382 is rendered in completeness for display, the anonymized OTP information of "&&&" 384 is further rendered and displayed as an operable link. As such, the user may choose to either select the "COPY CODE" button 386, or the operable link embedded in the anonymized OTP information 384 to initiate transferring the OTP information to the text field 322 of the app 320.

Figure 4A:
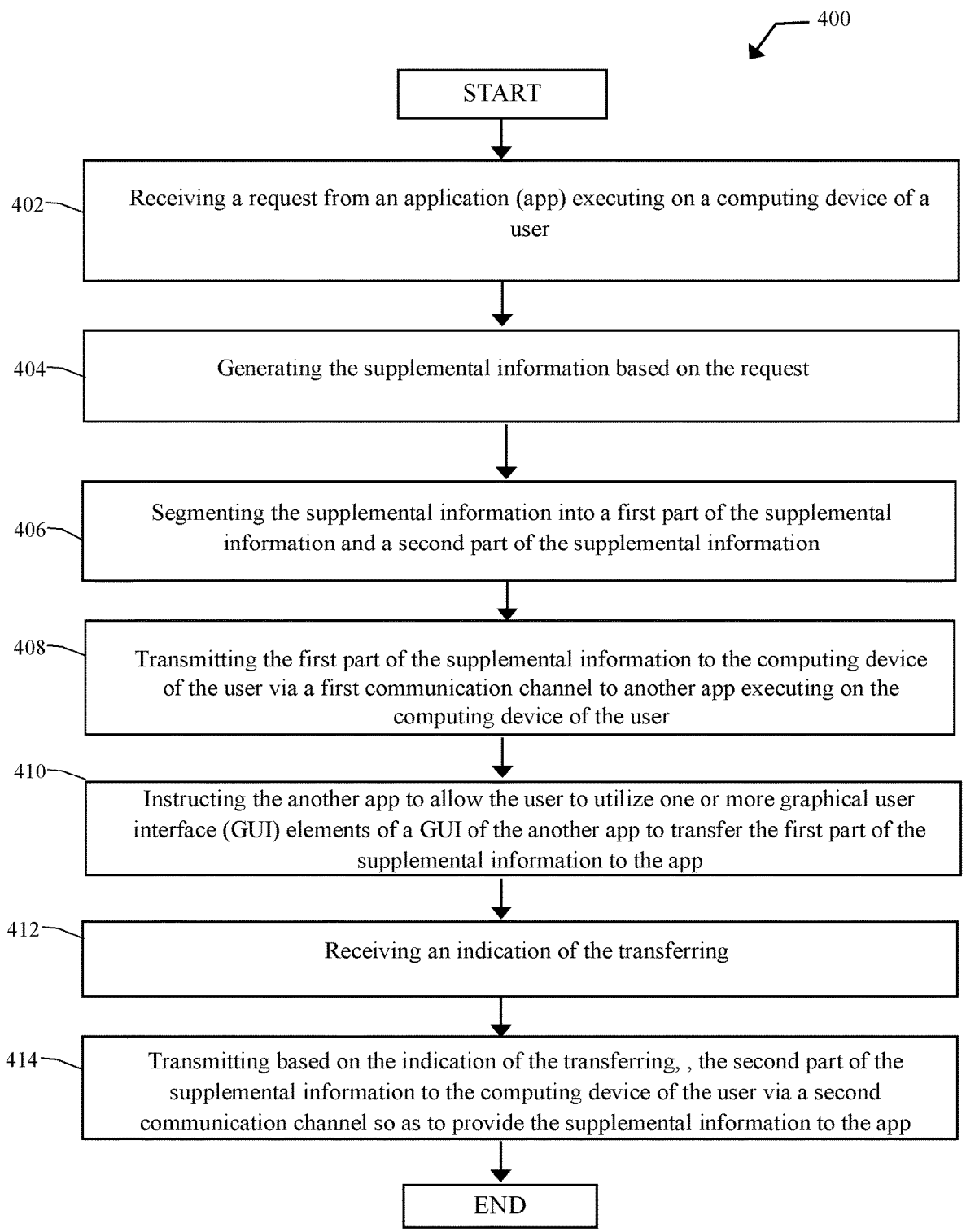
FIG. 4A is a flowchart depicting an exemplary method for providing challenge based authentications via enhanced OTP messaging, consistent with exemplary aspects of certain embodiments of the present disclosure.

FIG. 4A is a flowchart illustrating one exemplary process 400 related to providing challenge based authentication via enhanced OTP messaging, consistent with exemplary aspects of certain embodiments of the present disclosure. Referring to FIG. 4A, an illustrative process 400 related to providing enhanced OTP messaging based authentication at a computing device may comprise: receiving a request from an application (app) executing on a computing device of a user, at 402; generating the supplemental information based on the request, at 404; segmenting the supplemental information into a first part of the supplemental information and a second part of the supplemental information, at 406; transmitting the first part of the supplemental information to the computing device of the user via a first communication channel to another app executing on the computing device of the user, at 408; instructing the another app to allow the user to utilize one or more graphical user interface (GUI) elements of a GUI of the another app to transfer the first part of the supplemental information to the app, at 410; receiving an indication of the transferring, at 412; and transmitting based on the indication of the transferring, the second part of the supplemental information to the computing device of the user via a second communication channel so as to provide the supplemental information to the app, at 414. Further, such illustrative process 400 may be carried out, in whole or in part, via or in conjunction with the computing device user interface described above with reference to FIGS. 3A-3C.

According to the illustrative embodiment shown in FIG. 4A, process 400 may include, at 402, a step of receiving a request from an application (app) executing on a computing device of a user. With regard to various aspects of the disclosure, the request may be transmitted in response to the user operating the app to a stage where supplemental information is required to further operate one or more functionalities of the app. An illustration of a user interface of one such app is shown and discussed with connection to the FIGS. 3A-3B. In some embodiments, the request for the supplemental information is transmitted from the computing device at various stages during the user's interaction with the app. In one example, the request is received upon the user signs-in the app such that the user has to authenticate himself/herself using the supplemental information, in addition to providing the correct login credential at the app. In another example, the request is received upon the user operates the app to perform actions such as changing the password, changing the email associated with the app, making an in-app purchase over a threshold amount, and so on, after the user has signed-into the app.

The process 400 may include, at 404, a step of generating the supplemental information based on the request; and at 406, a step of segmenting the supplemental information into a first part of the supplemental information and a second part of the supplemental information. In some embodiments, the supplemental information may be generated by the server 101 of FIG. 1, or the server system 202 of FIG. 2, upon receiving the request from the user at the app. In some embodiments, the supplemental information may comprise an authentication factor, which can be used to authenticate the user operating the app. In some embodiments, the authentication factor may include an OTP. For example, the OTP may be configured as a random N-digit code that expires after a pre-configured period of time after transmission or generation. In various embodiment, N can be configured as any number suitable for the user's operation at the app, level of security measures configured at the server for the types of access the user attempts at the app, contexts relating to the user's operations at the app, and the like. For example, N is between 4 to 8. For example, N is 4. For example, N is 5. For example, N is 6. For example, N is 7. For example, N is 8. In other examples, the OTP may also be configured as a pseudorandom N-digit code. In yet some other example, the OTP may be configured as a random sequence of N images/symbols/animations/alphanumeric characters, or a combination thereof. Any suitable techniques can be utilized to generate such random/pseudorandom sequence of N data items. By way of non-limiting examples, random numbers may be generated by the use of: Monte Carlo methods, MIXMAX generator, Multiply-with-carry methods, Xorshift methods, Advanced Randomization System, and the like. Also, by way of non-limiting examples, pseudorandom numbers may be generated by the use of: Lehmer generator, Linear congruential generator, Wichmann-Hill generator, Park-Miller generator, Multiply-with-carry method, Permuted Congruential Generator, and the like.

In some embodiments, the first part of the supplemental information may be anonymized into unreadable format before being communicated to the app. According to various aspects of the disclosure, the supplemental information may be anonymized into data comprising, without limitation, one or more of: a string comprising, without limitation, one or more of randomized letters, numbers, and/or symbols; a visual content (e.g., image, video, visual animation, etc.); visual-audio content (e.g., video, voiced visual animation, etc.); audio content; and/or text in a language foreign to the user. As a result, the anonymized supplemental information, when received and displayed at a messaging app executing on the computing device, the supplemental information no longer is not readable for the user, thereby restricting the transfer of the real content of supplemental information to the app to the above-described GUI elements of the messaging app. In other words, the user or other parties no longer is able to read out or write down the supplemental information for being keyed into the app.

In some embodiments, the first part of the supplemental information may be anonymized such that the entire content of the supplemental information is, without limitation, in a form of animation (e.g., visual animation with or without voice, audio-only recording) that is not presented (e.g., displayed, voiced, or both) at the same time. In one example, the first part (e.g., a string of 3 digits/letters/symbols) of the supplemental information may be presented in the form of a visual presentation where the first digit/letter/symbol may be displayed for a first pre-configured duration of time (e.g., 1 second), the second digit/letter/symbol may be next displayed for a second pre-configured duration of time (e.g., 1 second), and lastly the third digit/letter/symbol may be displayed for a third pre-configured duration of time (e.g., 1 second).

In some embodiments, the first part of the supplemental information may be anonymized such that the entire content of the supplemental information may be embedded in camouflaging content items for displaying at the same time. In one example, an animation may be configured to display "123−23+7" to indicate to the user that the supplemental information is a string of six digits of "123237" despite the camouflaging content items of "−" and "+" displayed simultaneously. In another example, an animation may be configured to display "123" typed out, followed with two deletions and "07" typed out to indicate to the user that the supplemental information is also a string of six digits of "123237". In yet another example, an animation may be configured to display "123 twice" or "enter 123 twice" to indicate to the user that the supplemental information is a string of six digits of "123123". In still yet another example, an animation may be configured to display the first part of the supplemental information (e.g., half of the N digits of an OTP, one third of the N digits of an OTP) for a predetermined time period (e.g., 1 second), along with a formula or an instruction of the steps indicating to the user how to compose or otherwise interpret the full content of the supplemental information based on the animation displayed thereto. In those scenarios, the user may choose to manually enter the interpreted supplemental information into the app. Alternatively, the messaging tool may nevertheless be configured to extract the supplemental information for transferring to the app. In some embodiments, the anonymized information may be transferred to the app both in the conventional manner (e.g., the user enters the information) and the restricted manner (e.g., user operates the GUI element to cause the messaging tool to transfer to the app).

The process 400 may include, at 408, a step of transmitting the first part of the supplemental information to the computing device of the user via a first communication channel to another app executing on the computing device of the user. In various embodiments, the first part of the supplemental information and the second part of the supplemental information may be embedded in the respective messages for communication to the respective messaging apps executing on the user's computing device. The another app may be any app configured to receive the first part of the supplemental information. Here, as illustrated in connection with FIGS. 3A-3C, the another app may be an SMS app or an email app. In other examples, the another app may be a chat app, MMS app, or the like. Depending on the features of the another app, such a message may identify various information such as the identity of the sender, the identity of a recipient, a subject line, a timestamp, as well as a message body including the supplemental information (e.g., the first part and/or the second part). Examples of the messages are shown and discussed in connection with FIGS. 3A-3C, above.

In some embodiments, the messages may be customized for being displayed differently at the another app. Here, for example, the messages may be customized for being displayed differently at one or more of: a preview badge GUI of the another app, a push notification GUI of the another app, a full-blown GUI of the another app, information of the computing device, and information of an operating system of the computing device. Information of the computing device may include data pertaining to the hardware, software, and/or firmware of the computing device, data pertaining to the manufacturer, manufacturing date, operator, and so on. Information of an operating system of the computing device may include data pertaining to the versions, release dates, updates, patches, and so on. Illustrations of exemplary preview badge (banner) GUI, a push notification GUI, as well as a full-blown GUI of the another app are shown and discussed with connection to FIGS. 3A-3C, above.

In some embodiments, the messages may also be generated with customized content for being displayed at the another app. The message content may be customized based on various factors. For example, the message content may be customized according to data of the user, data of a group of users, as well as the above-discussed information of the computing device, and information of the operating system of the computing device. For instance, user data may comprise demographic data of the user and historical behavior data of the user. Data of a group of users may comprise demographic data of a group of users; and historical behavior data of the group of users. In various embodiments, with insight and intelligence respecting the user, similar users, user's computing device's capabilities and functionalities, both the format and content of the message may be customized to better appeal to the user, thereby contributing to a higher completion rate with regard to challenge based authentication involving the supplemental information.

The process 400 may include, at 410, a step of instructing the another app to allow the user to utilize one or more graphical user interface (GUI) elements of a GUI of the another app to transfer the first part of the supplemental information to the app; at 412, a step of receiving an indication of the transferring; and at 414, a step of transmitting, based on the indication of the transferring, the second part of the supplemental information to the computing device of the user via a second communication channel so as to provide the supplemental information to the app. Various embodiments herein may be configured such that the transferring of the supplemental information comprises populating the one or more GUI elements of the GUI of the app with the supplemental information to enable the user to operate the one or more functionalities of the app. In some embodiments, the supplemental information may be completely transferred to the app upon both the first part and the second part of the supplemental information have been provided to the app via user's operation of the one or more GUIs of the another app (and other apps).

In some embodiments, process 400 may further include steps of identifying a security token associated with the user from a dataset configured for accounts of users associated with the app, and generating the respective messages based on the security token. According to some aspects of the disclosure, the security token may specify by the user at a prior time, and displayed to the user in association with the another app. In implementations, the security token may comprise one or more of: an image, a passphrase, a tone, a displaying color, a displaying motif, and a displaying floating icon.

Figure 4B:
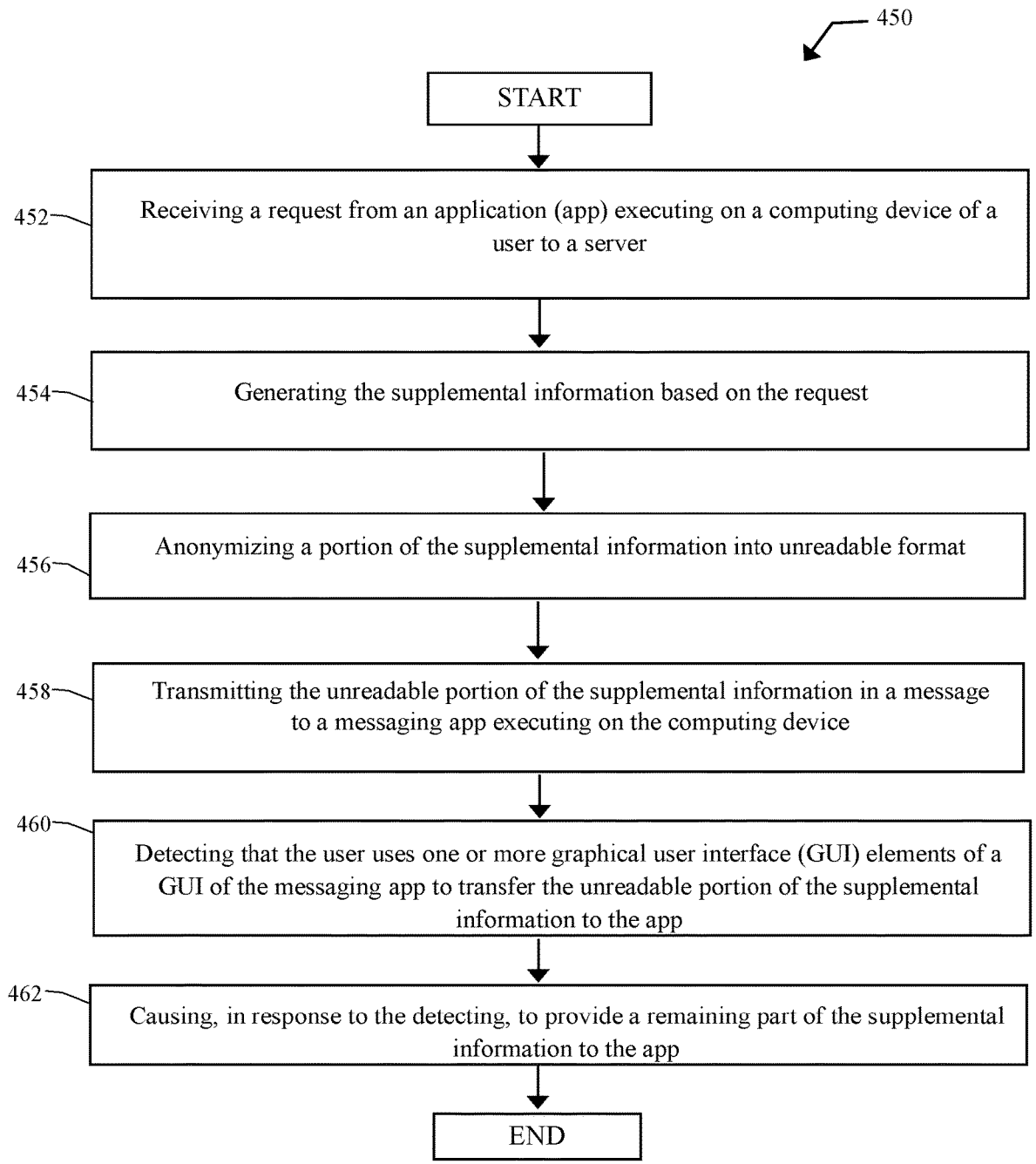
FIG. 4B is a flowchart depicting another exemplary method for providing challenge based authentications via enhanced OTP messaging, consistent with exemplary aspects of certain embodiments of the present disclosure.

FIG. 4B is a flowchart illustrating one exemplary process 450 related to providing challenge based authentication via enhanced OTP messaging, consistent with exemplary aspects of certain embodiments of the present disclosure. Referring to FIG. 4B, an illustrative process 450 related to providing enhanced OTP messaging based authentication at a computing device may comprise: receiving a request from an application (app) executing on a computing device of a user to a server, at 452; generating the supplemental information based on the request, at 454; anonymizing a portion of the supplemental information into unreadable format, at 456; transmitting the unreadable portion of the supplemental information in a message to a messaging app executing on the computing device, at 458; detecting that the user uses one or more graphical user interface (GUI) elements of a GUI of the messaging app to transfer the unreadable portion of the supplemental information to the app, at 460; and causing, in response to the detecting, to provide a remaining part of the supplemental information to the app, at 462. Further, such illustrative process 450 may be carried out, in whole or in part, via or in conjunction with the computing device user interface described above with reference to FIGS. 3A-3C.

According to the illustrative embodiment shown in FIG. 4A, process 400 may include, at 402, a step of receiving a request from an application (app) executing on a computing device of a user to a server. With regard to various aspects of the disclosure, the request may be transmitted in response to the user operating the app to a stage where supplemental information is required to further operate one or more functionalities of the app.

In some embodiments, process 400 may further include a step of generating the content of the message using a machine learning model. In implementations, the machine learning model may be trained using historical completion rates and user demographic data associated with historical message content, historical message formats, and historical message channels. In some embodiments, a training dataset may be generated by collecting various features associated with OTP messages in relation to the OTP messages' respective historical completion rates. In addition to the above-described demographic data, message content, message formats, and message channels, features associated with OTP message may further include data items including, but not limited to, contextual information relating to the OTP messages (e.g., transmitted at what time of day, date, etc.), contextual information relating to the user's operation with regard to the OTP messages (e.g., received at what time of day, date, accessed at what time of day, date, at what location, etc.), analytics data for the user (e.g., analytical data on user's activities and behaviors, e.g., whether the user has recently opened the app, the frequency, time duration of the user's log-ins at the app, the types of actions the user performs with the app, etc.), and information about the device used last time to receive an OTP message (or accessing the app, etc.).

In some embodiments, trained with the knowledge correlating the features relating to historical OTP messages with the completion rates, the machine learning model learns which combinations of the features work best in terms of incurring higher completion rates. For example, the machine model may be trained to learn that OTP messages reach younger populations more successful with certain channels, at certain times, with certain types of devices, or any combinations of the OTP message features observed. For another example, the machine learning model may be trained to learn that images in an MMS contribute to a better chance of higher completion rates late at night (e.g., the MMS transmitted late at night or the user accessing the MMS late at night). For yet another example, the machine learning model may be trained to learn about the user's behaviors (e.g., habits/schedule, etc.) based, at least in part, without limitation, on one or more user's interaction patterns with a computing device(s) (e.g., smartphone, etc.). In some embodiments, based on the learned user's behavior(s), the trained machine learning model may cause to transmit the OTP message to a computing device of the user without delay or introduce a time delay in transmitting the OTP message. Such a time delay may be configured, statically or dynamically, as any duration of time suitable for the user, contexts of the user, and the like. In one example, a time delay is configured as a number of milliseconds. Given the time delay suggested by the machine learning model, OTP messages may yield a better result in terms of completion rates as this would give the user time to context switch, or catch the user at a more appropriate time, etc. In some instances, messaging time delays may be learned and customized on an individual basis per user, or based on other features relating to OTP messaging (e.g., features of the user device, etc.).

In various embodiments, the machine learning model may take features relating to OTP messages as input, and output a suggested message format(s), and/or suggested message content to use for a new OTP message. In some embodiments, the suggested message format may be generated in an ordered list of message formats, with respective weights for their expected effectiveness attached thereto. In this scenario, AB tests of different options may also be performed to gain intelligence with regard to the effectiveness of OTP message features, rather than relying on a single result from the machine learning model.

In some embodiments, the machine learning model may be trained with training datasets of data collected based on multiple users' historical interactions with regard to OTP messages. In other embodiments, the machine learning model may be trained based on per-user optimization. For example, users may be segmented or clustered based on one or more characteristics (e.g., demographics, psychographics, social media-related characteristics, etc.) such that information about the best segment for each user can be stored and utilized to recommend message format(s)/content for future OTP messaging for communication with the user (e.g., using unsupervised learning).

According to various embodiments of the disclosure, with insight and intelligence provided by the machine learning model (and other techniques), various aspects of the message including both the format and content may be customized to better appeal to the user, thereby contributing to a higher completion rate with regard to challenge based authentication involving the supplemental information.

Figure 5:
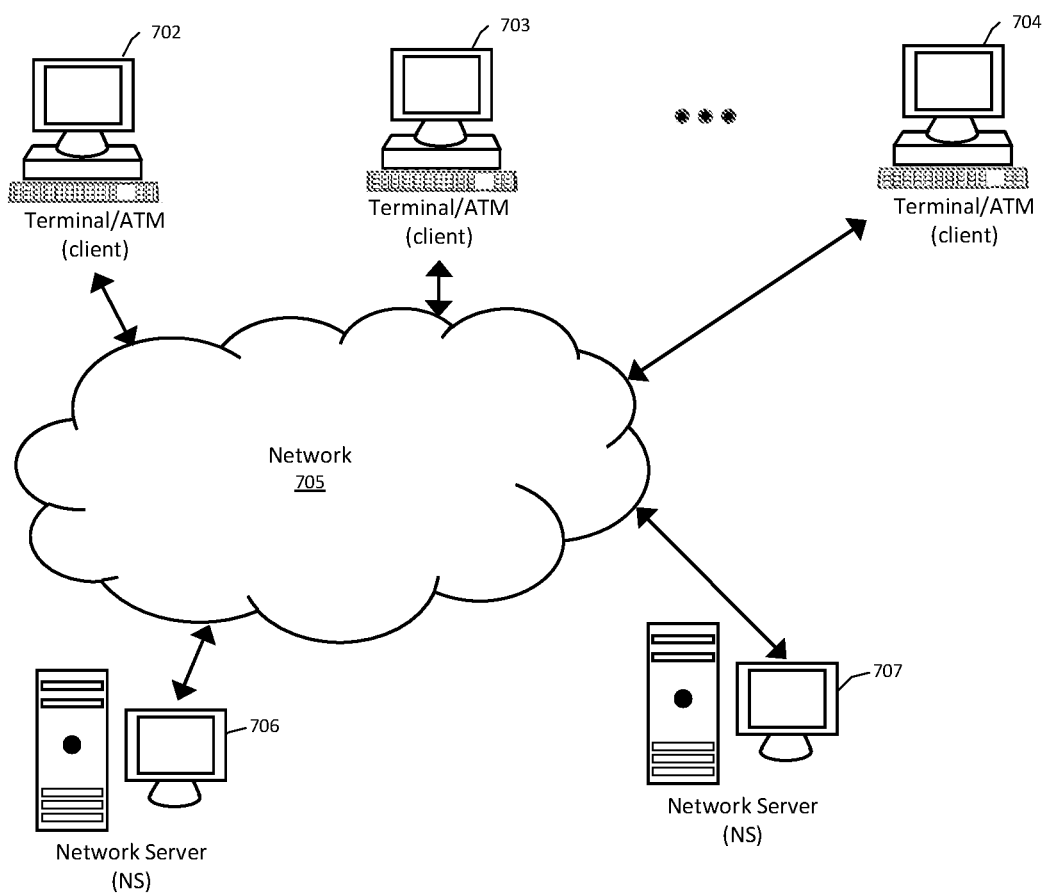
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, members 702-704 (e.g., POS devices or clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 5, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
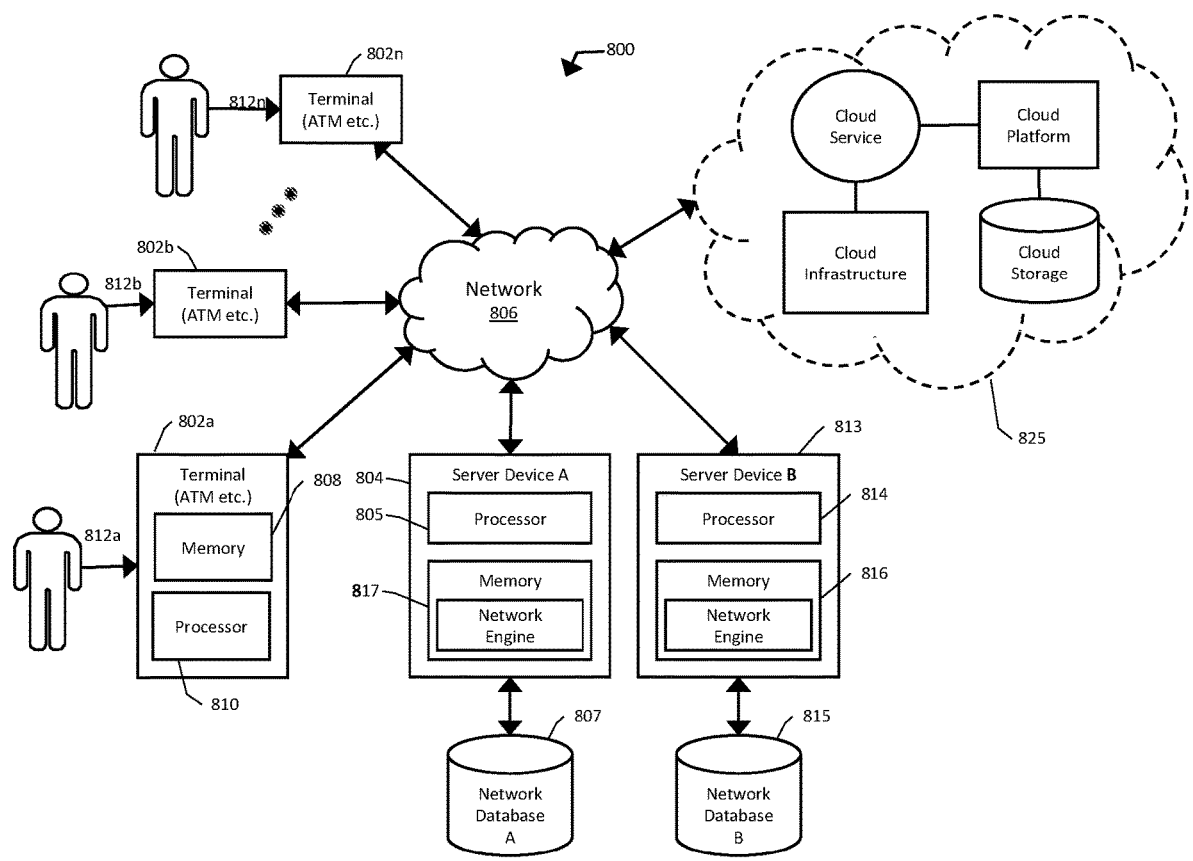
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices (e.g., POS devices) 802a, 802b thru 802n shown each at least includes computer-readable media, such as a random-access memory (RAM) 808 coupled to a processor 810 and/or memory 808. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a through 802n may also comprise a number of external or internal devices such as a mouse, a CD-ROM, DVD, a physical or virtual keyboard, a display, a speaker, or other input or output devices. In some embodiments, examples of member computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a through 802n may be specifically programmed with one or more application programs in accordance with one or more principles/methodologies detailed herein. In some embodiments, member computing devices 802a through 802n may operate on any operating system capable of supporting a browser or browser-enabled application, such as Microsoft™, Windows™, and/or Linux. In some embodiments, member computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a through 802n, users, 812a through 802n, may communicate over the exemplary network 806 with each other and/or with other systems and/or devices coupled to the network 806.

As shown in FIG. 6, exemplary server devices 804 and 813 may be also coupled to the network 806. In some embodiments, one or more member computing devices 802a through 802n may be mobile clients. In some embodiments, server devices 804 and 813 shown each at least includes respective computer-readable media, such as a random-access memory (RAM) coupled to a respective processor 805, 814 and/or respective memory 817, 816. In some embodiments, the processor 805, 814 may execute computer-executable program instructions stored in memory 817, 816, respectively. In some embodiments, the processor 805, 814 may include a microprocessor, an ASIC, and/or a state machine. In some embodiments, the processor 805, 814 may include, or may be in communication with, media, for example computer-readable media, which stores instructions that, when executed by the processor 805, 814, may cause the processor 805, 814 to perform one or more steps described herein. In some embodiments, examples of computer-readable media may include, but are not limited to, an electronic, optical, magnetic, or other storage or transmission device capable of providing a processor, such as the respective processor 805, 814 of server devices 804 and 813, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other media from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
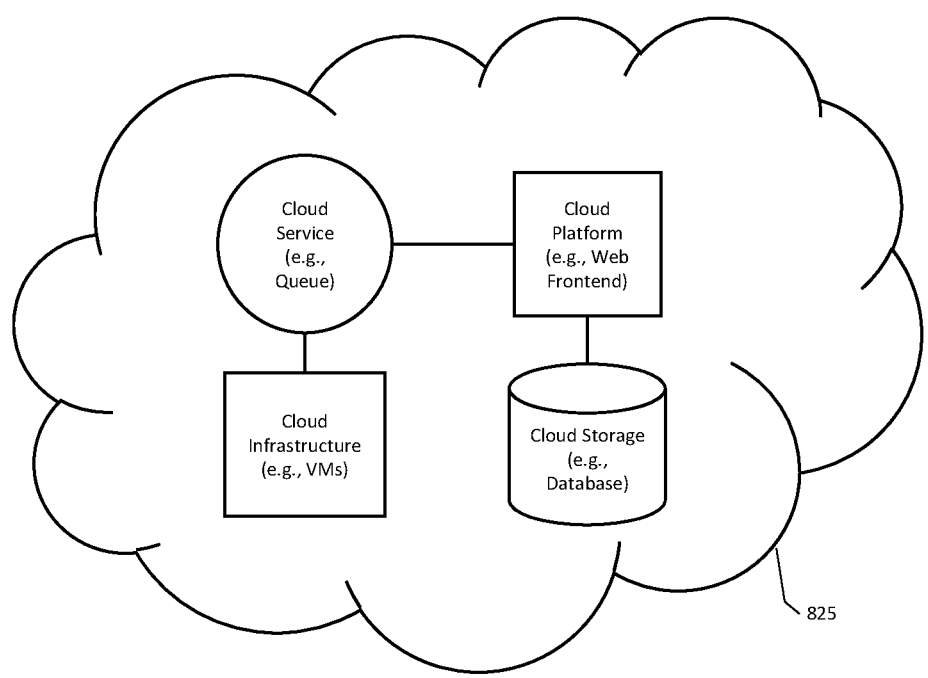
FIGS. 7 and 8 are diagrams illustrating two exemplary implementations of cloud computing architecture/aspects with respect to which the disclosed technology may be specifically configured to operate, in accordance with certain embodiments of the present disclosure.
Figure 8:
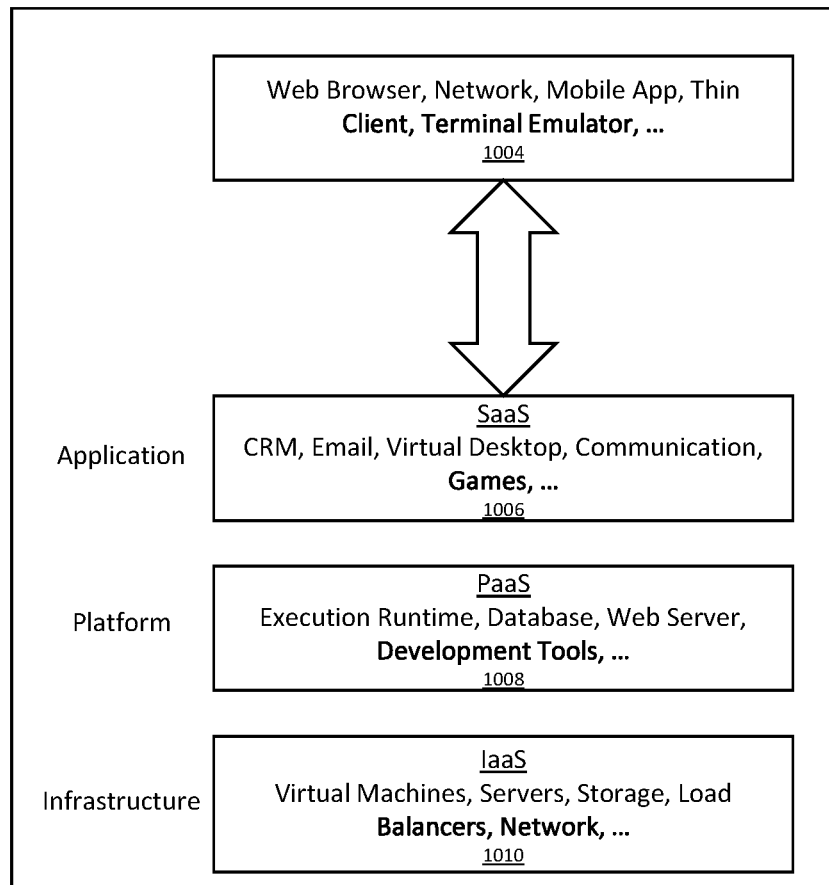

As also shown in FIGS. 7 and 8, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 7 and 8 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFL's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 7-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A method comprising:
receiving, by a processor, a request from an application (app) executing on a computing device of a user, the request being transmitted in response to the user operating the app to a stage where supplemental information is required to further operate one or more functionalities of the app;
generating, by the processor, the supplemental information based on the request;
segmenting, by the processor, the supplemental information into a first part of the supplemental information and a second part of the supplemental information;
transmitting, by the processor, the first part of the supplemental information to the computing device of the user via a first communication channel to another app executing on the computing device of the user;
instructing, by the processor, the another app to allow the user to utilize one or more graphical user interface (GUI) elements of a GUI of the another app to transfer the first part of the supplemental information to the app;
receiving, by the processor, an indication of the transferring; and
transmitting, by the processor based on the indication of the transferring, the second part of the supplemental information to the computing device of the user via a second communication channel so as to provide the supplemental information to the app.

Clause 2. The method of clause 1 or of any clause herein, wherein the supplemental information comprises an authentication factor.

Clause 3. The method of clause 2 of any clause herein, wherein the authentication factor includes a one-time passcode one-time passcode (OTP).

Clause 4. The method of clauses 1-3 of any clause herein, wherein the generating the supplemental information comprises:
anonymizing, by the processor, the first part of the supplemental information into unreadable format.

Clause 5. The method of clauses 1-4 of any clause herein, wherein the first part of the supplemental information and the second part of the supplemental information are embedded in respective messages, and the method further comprising:
identifying, by the processor, a security token associated with the user from a dataset configured for accounts of users associated with the app, the security token being specified by the user at a prior time; and generating, by the processor, the respective messages based on the security token.

Clause 6. The method of clauses 1-5 of any clause herein, wherein the security token comprises one or more of: an image, a pass phrase, a tone, a displaying color, a displaying motif, and a displaying floating icon, the security token being displayed to the user in association with the another app.

Clause 7. The method of clauses 1-6 of any clause herein, wherein the transferring the supplemental information comprises:

populating the one or more GUI elements of the GUI of the app with the supplemental information to enable the user to operate the one or more functionalities of the app.

Clause 8. The method of clauses 1-7 of any clause herein, wherein the supplemental information is displayed at the another app as anonymized data, the anonymized data comprising one or more of: a string comprising one or more of randomized letters, numbers, and symbols; an image; and text in a language foreign to the user, the supplemental information not readable for the user and provided to the app only upon transferring to the app.

Clause 9. The method of clauses 1-8 of any clause herein, wherein a message comprising at least part of the supplemental information is customized for being displayed differently via one or more of: a preview badge GUI of the another app, a push notification GUI of the another app, a full-blown GUI of the another app, information of the computing device, and information of an operating system of the computing device.

Clause 10. The method of clauses 1-9 of any clause herein, wherein content of a message comprising at least part of the supplemental information is customized based on one or more of:

demographic data of the user; historical behavior data of the user; demographic data of a group of users; and historical behavior data of the group of users.

Clause 11. A method comprising:

receiving, by a server, a request from an application (app) executing on a computing device of a user to a server, the request being transmitted in response to the user operating the app to a stage where supplemental information is required to further operate one or more functionalities of the app;

determining, by the server, the supplemental information based on the request;

anonymizing, by the server, a portion of the supplemental information into unreadable format;

transmitting, by the server, the unreadable portion of the supplemental information in a message to a messaging app executing on the computing device;

detecting, by the server, that the user uses one or more graphical user interface (GUI) elements of a GUI of the messaging app to transfer the unreadable portion of the supplemental information to the app; and causing, by the server, in response to the detecting, to provide a remaining part of the supplemental information to the app.

Clause 12. The method of clause 11 of any clause herein, further comprising:

generating, by the server, content of the message using a machine learning model, the machine learning model trained using historical completion rates and user demographic data associated with historical message content, historical message formats, and historical message channels.

Clause 13. A server comprising:

one or more processors; and a memory in communication with the one or more processors and storing instructions that, when executed by the one or more processors, cause the server to:

receive a request from an application (app) executing on a computing device of a user, the request being transmitted in response to the user operating the app to a stage where supplemental information is required to further operate one or more functionalities of the app; generate the supplemental information based on the request;

segment the supplemental information into a first part of the supplemental information and a second part of the supplemental information;

transmit the first part of the supplemental information to the computing device of the user via a first communication channel to another app executing on the computing device of the user;

instruct the another app to allow the user to utilize one or more graphical user interface (GUI) elements of a GUI of the another app to transfer the first part of the supplemental information to the app;

receive an indication of the transferring; and transmit, based on the indication of the transferring, the second part of the supplemental information to the computing device of the user via a second communication channel so as to provide the supplemental information to the app.

Clause 14. The server of clause 13 of any clause herein, wherein the supplemental information comprises an authentication factor.

Clause 15. The server of clauses 13-14 of any clause herein, wherein the authentication factor includes a one-time passcode (OTP).

Clause 16. The server of clauses 13-15 of any clause herein, wherein to generate the supplemental information comprises to:

anonymize the first part of the supplemental information into unreadable format.

Clause 17. The server of clauses 13-16 of any clause herein, wherein the first part of the supplemental information, and the instructions further causing the server to:

identify a security token associated with the user from a dataset configured for accounts of users associated with the app, the security token being specified by the user at a prior time; and generate the respective messages based on the security token.

Clause 18. The server of clauses 13-17 of any clause herein, wherein to transfer the supplemental information comprises to:

populate the one or more GUI elements of the GUI of the app with the supplemental information to enable the user to operate the one or more functionalities of the app.

Clause 19. The server of clauses 13-18 of any clause herein, wherein the supplemental information is displayed at the another app as anonymized data, the anonymized data comprising one or more of: a string comprising one or more of randomized letters, numbers, and symbols; an image; and text in a language foreign to the user, the supplemental information not readable for the user and provided to the app only upon transferring to the app.

Clause 20. The server of clauses 13-19 of any clause herein, wherein the message is customized for being displayed differently via one or more of: a preview badge GUI of the another app, a push notification GUI of the another app, a full-blown GUI of the another app, information of the computing device, and information of an operating system of the computing device.

The invention claimed is:

1. A method comprising:

receiving, by a processor, a request from an application (app) executing on a computing device of a user, the request being transmitted in response to the user operating the app to a stage where supplemental information is required to further operate one or more functionalities of the app;

generating, by the processor, the supplemental information based on the request;

segmenting, by the processor, the supplemental information into a first part of the supplemental information and a second part of the supplemental information;

transmitting, by the processor, the first part of the supplemental information to the computing device of the user via a first communication channel to another app executing on the computing device of the user;

identifying, by the processor, a security token associated with the user from a dataset having accounts of users associated with the app, the security token being specified by the user at a prior time;

generating, by the processor, a first message based on the security token;

instructing, by the processor, the another app to allow the user to utilize one or more graphical user interface (GUI) elements of a GUI of the another app to transfer the first part of the supplemental information to the app via the first message;

receiving, by the processor, an indication of the transferring of the first part of the supplemental information to the app;

generating, by the processor, a second message based on the security token; and transmitting, by the processor based on the indication of the transferring, the second part of the supplemental information to the computing device of the user via a second communication channel so as to provide the supplemental information to the app via the second message.

2. The method of claim 1, wherein the supplemental information comprises an authentication factor.

3. The method of claim 2, wherein the authentication factor includes a one-time passcode (OTP).

4. The method of claim 1, wherein the generating the supplemental information comprises:
anonymizing, by the processor, the first part of the supplemental information into unreadable format.

5. The method of claim 1, wherein the security token comprises one or more of: an image, a pass phrase, a tone, a displaying color, a displaying motif, and a displaying floating icon, the security token being displayed to the user in association with the another app.

6. The method of claim 1, wherein the transferring the supplemental information comprises: populating the one or more GUI elements of the GUI of the app with the supplemental information to enable the user to operate the one or more functionalities of the app.

7. The method of claim 1, wherein the supplemental information is displayed at the another app as anonymized data, the anonymized data comprising one or more of:
a string comprising one or more of randomized letters, numbers, and symbols;
an image; and
text in a language foreign to the user,
the supplemental information not readable for the user and provided to the app only upon transferring to the app.

8. The method of claim 1, wherein a message comprising at least part of the supplemental information is customized for being displayed differently via one or more of:
a preview badge GUI of the another app,
a push notification GUI of the another app,
a full-blown GUI of the another app,
information of the computing device, and
information of an operating system of the computing device.

9. The method of claim 1, wherein content of a message comprising at least part of the supplemental information is customized based on one or more of:
demographic data of the user;
historical behavior data of the user;
demographic data of a group of users; and
historical behavior data of the group of users.

10. A method comprising:
receiving, by a server, a request from an application (app) executing on a computing device of a user to the server, the request being transmitted in response to the user operating the app to a stage where supplemental information is required to further operate one or more functionalities of the app;

determining, by the server, the supplemental information based on the request;

anonymizing, by the server, a portion of the supplemental information into unreadable format to obtain an unreadable portion of the supplemental information;

identifying, by the server, a security token associated with the user from a dataset having accounts of users associated with the app, the security token being specified by the user at a prior time;

generating, by the server, a first message based on the security token;

transmitting, by the server, the unreadable portion of the supplemental information in the first message to a messaging app executing on the computing device;

detecting, by the server, that the user uses one or more graphical user interface (GUI) elements of a GUI of the messaging app to transfer the unreadable portion of the supplemental information to the app;

generating, by the server, a second message based on the security token; and causing, by the server, in response to the detecting, to provide a remaining part of the supplemental information to the app via the second message.

11. The method of claim 10, further comprising:
generating, by the server, content of the message using a machine learning model, the machine learning model trained using historical completion rates and user demographic data associated with historical message content, historical message formats, and historical message channels.

12. A server comprising:
one or more processors; and
a memory in communication with the one or more processors and storing instructions that, when executed by the one or more processors, cause the server to:
receive a request from an application (app) executing on a computing device of a user, the request being transmitted in response to the user operating the app to a stage where supplemental information is required to further operate one or more functionalities of the app;
generate the supplemental information based on the request;
segment the supplemental information into a first part of the supplemental information and a second part of the supplemental information;
transmit the first part of the supplemental information to the computing device of the user via a first communication channel to another app executing on the computing device of the user;
identify a security token associated with the user from a dataset having accounts of users associated with the app, the security token being specified by the user at a prior time;

generate a first message based on the security token;
instruct the another app to allow the user to utilize one or more graphical user interface (GUI) elements of a GUI of the another app to transfer the first part of the supplemental information to the app via the first message;
receive an indication of the transferring of the first part of the supplemental information to the app;
generate a second message based on the security token; and
transmit, based on the indication of the transferring, the second part of the supplemental information to the computing device of the user via a second communication channel so as to provide the supplemental information to the app via the second message.

13. The server of claim 12, wherein the supplemental information comprises an authentication factor.

14. The server of claim 13, wherein the authentication factor includes a one-time passcode (OTP).

15. The server of claim 12, wherein to generate the supplemental information comprises to: anonymize the first part of the supplemental information into unreadable format.

16. The server of claim 12, wherein to transfer the supplemental information comprises to:
populate the one or more GUI elements of the GUI of the app with the supplemental information to enable the user to operate the one or more functionalities of the app.

17. The server of claim 12, wherein the supplemental information is displayed at the another app as anonymized data, the anonymized data comprising one or more of:
  a string comprising one or more of randomized letters, numbers, and symbols;
  an image; and
  text in a language foreign to the user,
  the supplemental information not readable for the user and provided to the app only upon transferring to the app.

18. The server of claim 12, wherein the first part of the supplemental information is customized for being displayed differently via one or more of:
  a preview badge GUI of the another app,
  a push notification GUI of the another app,
  a full-blown GUI of the another app,
  information of the computing device, and
  information of an operating system of the computing device.

* * * * *